United States Patent [19]

Shirasaki

[11] Patent Number: 5,557,157
[45] Date of Patent: Sep. 17, 1996

[54] VIBRATION DRIVEN MOTOR

[75] Inventor: Takayuki Shirasaki, Yokohama, Japan

[73] Assignee: Canon Kabushiki Kaisha, Tokyo, Japan

[21] Appl. No.: 380,333

[22] Filed: Jan. 30, 1995

Related U.S. Application Data

[63] Continuation of Ser. No. 86,362, Jul. 6, 1993, abandoned, which is a continuation of Ser. No. 619,345, Nov. 29, 1990, abandoned.

[30] Foreign Application Priority Data

Nov. 30, 1989 [JP] Japan .................. 1-312048
Nov. 30, 1989 [JP] Japan .................. 1-312049
Nov. 30, 1989 [JP] Japan .................. 1-312051

[51] Int. Cl.$^6$ ............................................. H01L 41/08
[52] U.S. Cl. ............................................. 310/323
[58] Field of Search ................................. 310/323, 328

[56] References Cited

U.S. PATENT DOCUMENTS

| | | | |
|---|---|---|---|
| 4,736,129 | 4/1988 | Endo et al. | 310/323 |
| 4,739,212 | 4/1988 | Imasaka et al. | 310/323 |
| 4,779,018 | 10/1988 | Okuno et al. | 310/323 |
| 4,926,085 | 5/1990 | Sawayama et al. | 310/323 |
| 4,939,404 | 7/1990 | Inagaki et al. | 310/323 |
| 4,963,781 | 10/1990 | Sumihara et al. | 310/323 |
| 4,965,482 | 10/1990 | Ohnishi et al. | 310/323 |
| 4,978,882 | 12/1990 | Kitani | 310/328 |
| 5,034,646 | 7/1991 | Shirasaki | 310/323 |
| 5,059,849 | 10/1991 | Sumihara et al. | 310/323 |
| 5,066,884 | 11/1991 | Takagi et al. | 310/323 |
| 5,150,000 | 9/1992 | Imasaka et al. | 310/323 |

FOREIGN PATENT DOCUMENTS

| | | | |
|---|---|---|---|
| 0222394 | 5/1987 | European Pat. Off. | 310/323 |
| 0023379 | 1/1987 | Japan | 310/323 |
| 0058888 | 3/1987 | Japan | 310/323 |
| 0053182 | 3/1987 | Japan | 310/323 |
| 0147979 | 7/1987 | Japan | 310/323 |
| 0136986 | 6/1988 | Japan | 310/323 |
| 63-02773 | 12/1988 | Japan . | |

*Primary Examiner*—Mark O. Budd
*Attorney, Agent, or Firm*—Fitzpatrick, Cella, Harper & Scinto

[57] ABSTRACT

In a vibration wave motor wherein a member provided with a composite resin layer providing a contact surface with respect to a vibration member for generating a travelling vibration wave is brought into pressure contact with the vibration member, whereby the vibration member and the member pressure-contacting therewith are moved relative to each other by friction driving with the aid of the travelling vibration wave generated in the vibration member, the composite resin layer is formed of a composite resin composed of a thermosetting resin, for example, an aromatic polyimide resin, as a base material, and a friction regulating agent and, if required, a non-fiber type wear resistance improving agent blended with the base material.

26 Claims, 2 Drawing Sheets

VIBRATION DRIVEN MOTOR

This application is a continuation of application Ser. No. 08/086,362, filed Jul. 6, 1993, now abandoned, which is a continuation of Ser. No. 07/619,345, filed Nov. 29, 1990, now abandoned.

BACKGROUND OF THE INVENTION

1. Field of the Invention

This invention relates to a vibration wave motor in which a travelling vibration wave is generated in a vibration member by a voltage being applied to an electro-mechanical energy conversion element and relative movement is caused between said vibration member and a member which is in contact therewith by friction driving, and in particular to a vibration wave motor of the high output type.

2. Related Background Art

A vibration wave motor according to the prior art, particularly a vibration wave motor of the high output type, is formed by a group of thin annular piezo-electric elements, which secured, for example, to the back of an annular vibration member substrate formed of stainless steel. A super-hard material composed of tungsten carbide and cobalt is thermally sprayed onto the surface of the annular vibration member substrate and is polished to thereby form a hard sliding surface. On the other hand, as a member contacting therewith, a sliding member formed into a toughened type composite resin layer by causing a toughening material such as carbon fiber to be contained in a thermoplastic resin having a glass transition point of 100° C. or higher, specifically, heat-resisting resin such as polyimide (PI), polyamideimide (PAI), polyetherimide (PEI), polyether ether ketone (PEEK), polyethersulfone (PES), polyaryrate (PAR), polysulfone (PSF) or aromatic polyamide, is secured to a back-up member of an aluminum alloy or the like. The vibration member and the member contacting therewith are moved relative to each other in a friction driven fashion by a travelling vibration wave generated in the vibration member.

The relative movement of the vibration member and the member contacting therewith may be such that either of them is fixed or movable. However, in the following description herein, for simplicity of description, the vibration member is shown as being fixed and the member contacting therewith is shown as being movable. Accordingly the latter member will hereinafter be referred to as the "movable member".

Now, the reason why in the above-described vibration wave motor according to the prior art, a sliding member formed of thermoplastic resin having a glass transition point of 100° C. or higher as the base material is used as the toughened type composite resin layer forming a part of the movable member is that such heat-resisting resin is small in temperature dependency as the property of matter and is free from torque-down phenomenon attributable to the softening of the resin material even for the temperature rise during the driving of the motor and can stabilize the performance and accuracy of the motor.

Also, the reason why a toughening material such as carbon fiber is combined with said resin material is: firstly, to ensure the properties of the sliding surface of the movable member to be always stable relative to the sliding surface of the superhard material of the vibration member formed, for example, of tungsten carbide and cobalt and, moreover, to ensure sufficient wear resistance during a long time of driving as well; secondly, to make the value of a property of matter such as the elastic modulus or the hardness of the sliding member great and improve the performance of the motor, such as its output; and, thirdly, to improve the heat conductivity of the sliding member and improve the performance of the motor, such as its efficiency.

As described above, in the vibration wave motor, the toughened type composite resin composed of heat-resisting thermoplastic resin having a glass transition point of 100° C. or higher and filled with carbon fiber is used for the sliding member providing the sliding surface of the movable member, whereby the performance and accuracy of the motor are stable even during a temperature rise caused by the driving of the motor, and the wear resistance is sufficient relative to the superhard material forming the sliding surface of the vibration member even when the motor is driven for a long time and further, the performance of the motor, such as output and efficiency, exhibit high values.

However, if the sliding surface of the composite resin layer of the movable member, which is formed of heat-resisting thermoplastic resin toughened by said carbon fiber, is brought into pressure contact with the hard sliding surface of the vibration member, which is formed of the super-hard material, when driving is started, for example, at 4 kg.cm and 100 rpm as the conditions of rated operation, the "waviness" or the like of torque may sometimes pose a problem with the temperature rise of the frictional sliding surface, and it has been found that there are further points to be improved for further improvements in the performance and accuracy of the motor.

Also, in the rated continuous operation, there is torque irregularity of the order of 5% for the rated torque value, and further improvement has been desired.

Furthermore, although there is no problem when the load torque is great, there has been the problem that the phenomenon of so-called "echo" based on sliding friction is caused by driving during no-load or low load.

SUMMARY OF THE INVENTION

An object of the present invention which has been made in view of such points is to provide a vibration wave motor of high efficiency which exhibits an excellent sliding characteristic even under high temperatures and in which the "waviness" and irregularity of torque have been reduced.

Another object of the present invention is to provide a vibration wave motor of novel construction which can eliminate the "echo" in the driving during no-load or low load which has heretofore posed a problem in a vibration wave motor, and particularly a vibration wave motor of the high output type.

Still another object of the present invention is to provide a vibration wave motor in which a hard surface which can be inexpensively formed by the electroless plating method can be used as the sliding surface of a vibration member contacted by a movable member.

The feature of the vibration wave motor of the present invention which has been made to achieve the above objects is that in a vibration wave motor wherein a member provided with a composite resin layer providing a contact surface with respect to a vibration member for generating a travelling vibration wave is brought into pressure contact with the vibration member, whereby the vibration member and the member pressure-contacting therewith are moved relative to each other by friction driving with the aid of the travelling vibration wave generated in the vibration member, the composite resin layer is formed of composite resin composed of thermosetting resin, for example, aromatic polyimide resin, as a base material, and a friction regulating agent and if required, a non-fiber type wear resistance improving agent blended with the base material.

Typically, the vibration wave motor of the present invention is constructed as a vibration wave motor, in which a voltage is applied to a driving phase, comprising an electromechanical energy conversion element to thereby generate a travelling vibration wave in an annular vibration member in which the driving phase is provided, whereby a movable member brought into pressure contact with the vibration member is frictionally driven. The movable member is comprised of a back-up member of an aluminum alloy or the like having good heat conductivity, and the composite resin layer is made integral with the said back-up member and provides a sliding surface for contacting the vibration member.

Also, as the vibration member in the vibration wave motor of the present invention, use can be made of a vibration member in which, as in the prior art, a super-hard material composed of tungsten carbide and cobalt is thermally sprayed onto the surface of a vibration member substrate made of a metal or the like and is polished as required so as to provide a sliding surface. Alternatively use can be made of a vibration member in which a super-hard surface of nickel-phosphor group alloy containing one or more of silicon carbide (SIC), boron carbide ($B_4C$), boron titanium ($TiB_2$) and boron nitride (BN) is formed by the use of the electroless plating method.

The vibration wave motor of the present invention is characterized by a movable member formed by the use of the above-described composite resin material, or a movable member formed by a sliding member formed by the use of the composite resin material being integrally secured to a back-up member.

To form such a composite resin layer and to make it integral with the back-up member of the movable member, generally, a sliding member of the composite resin material may be formed by injection molding or extrusion molding and may be integrally secured onto the back-up member by the use of an adhesive agent. The securing of the sliding member formed of the composite resin material onto the back-up member can be accomplished by the use of an adhesive agent having a glass transition point of 100° C. or higher. As such an adhesive agent, mention may specifically be made of a chemical reaction type epoxy adhesive agent in which the heat-resisting adhesive strength and heat-aging property at 100° C. are sufficiently taken into account.

Aromatic polyimide resin is thermosetting resin, and as such resin, mention may typically be made of a condensate of biphenyl tetracarboxylic acid 2-anhydride and aromatic diamine ("UPILEX" (tradename; produced by Ube Kosan Co., Ltd.)), and a condensate of pyromellitic acid anhydride and diaminodiphenyl ether ("VESPEL" (tradename; produced by Du Pont, Inc.). These condensates, among plastics over a wide range, are excellent in the characteristic at high temperatures, and for example, have a heat deformation temperature of 350° C. under a load of 18.8 kg/cm$^2$, and exhibit the strength of popular engineering plastics at a normal temperature even under a continuously used temperature of 260° C.

The composite resin layer of the present invention is filled up with a friction regulating agent, preferably a friction regulating agent in the form of a powder. Such a friction regulating agent is used to improve the lubricating property or the like of the thermosetting resin which is the base material. Such a friction regulating agent may generally be a solid lubricant in the form of amorphous powder. Specifically, it may be a powder of fluorine resin, molybdenum disulfide, lead oxide, lead or the like (any of which is non-fiber).

Typically, it is especially preferable that the friction regulating agent be composed of a lead compound such as lead monoxide of a weight percentage of 30% or less and a fluorine resin such as tetrafluoroethylene of a weight percentage of 5–40% added to the base material at a time.

The tetrafluoroethylene resin is a low friction coefficient resin and therefore, if the amount thereof added is too great, the coefficient of friction will become small, but the strength and wear resistance of the material will be reduced and thus, that range is chosen.

Powder of the lead monoxide and powder of the tetrafluoroethylene are both effective as solid lubricants for making up for the lubricating property of the thermosetting resin which is the base material, and powder of the lead monoxide has the action of causing the coating of tetrafluoroethylene resin to transit to the sliding surface of the vibration member when the sliding surface of the composite resin layer is frictionally driven relative to the sliding surface of the vibration member, and is a substance especially effective to always stabilize the coefficient of friction in the sliding at high temperature.

Powder of a lead compound such as the lead monoxide and powder of a fluorine resin such as the tetrafluoroethylene resin, as lubricants, may preferably have an average particle diameter of 20 μm or less in order to ensure the wear resistance and material strength of the composite resin layer, with the adhesion thereof with respect to the thermosetting resin which is the base material being taken into account. Tetrafluoroethylene resin (PTFE) is a low friction coefficient resin and therefore, if the amount thereof used is great, the coefficient of friction will become small, but the material strength and wear resistance will be reduced.

Also, the composite resin layer may further have blended therewith, as required, transition a metal powder for the purpose of improving the wear resistance thereof and improving the stability thereof for any variation in the temperature of the sliding surface. Such transition metal powder may specifically be tungsten, molybdenum, chromium, cobalt, titanium or nickel, and by way of example, at least one of tungsten powder of 40% or less (20 μm or less) and molybdenum powder of 15% or less (20 μm or less) may be added to the base material. As a wear resistance improving agent of the non-fiber type, spherical carbon having an average particle diameter of 10–30 μm may be used instead of the transition metal, and particularly, carbon beads having high hardness and high heat conductivity, like carbon fiber, may be mentioned by way of example.

DETAILED DESCRIPTION OF THE PREFERRED EMBODIMENTS

Figure 1:
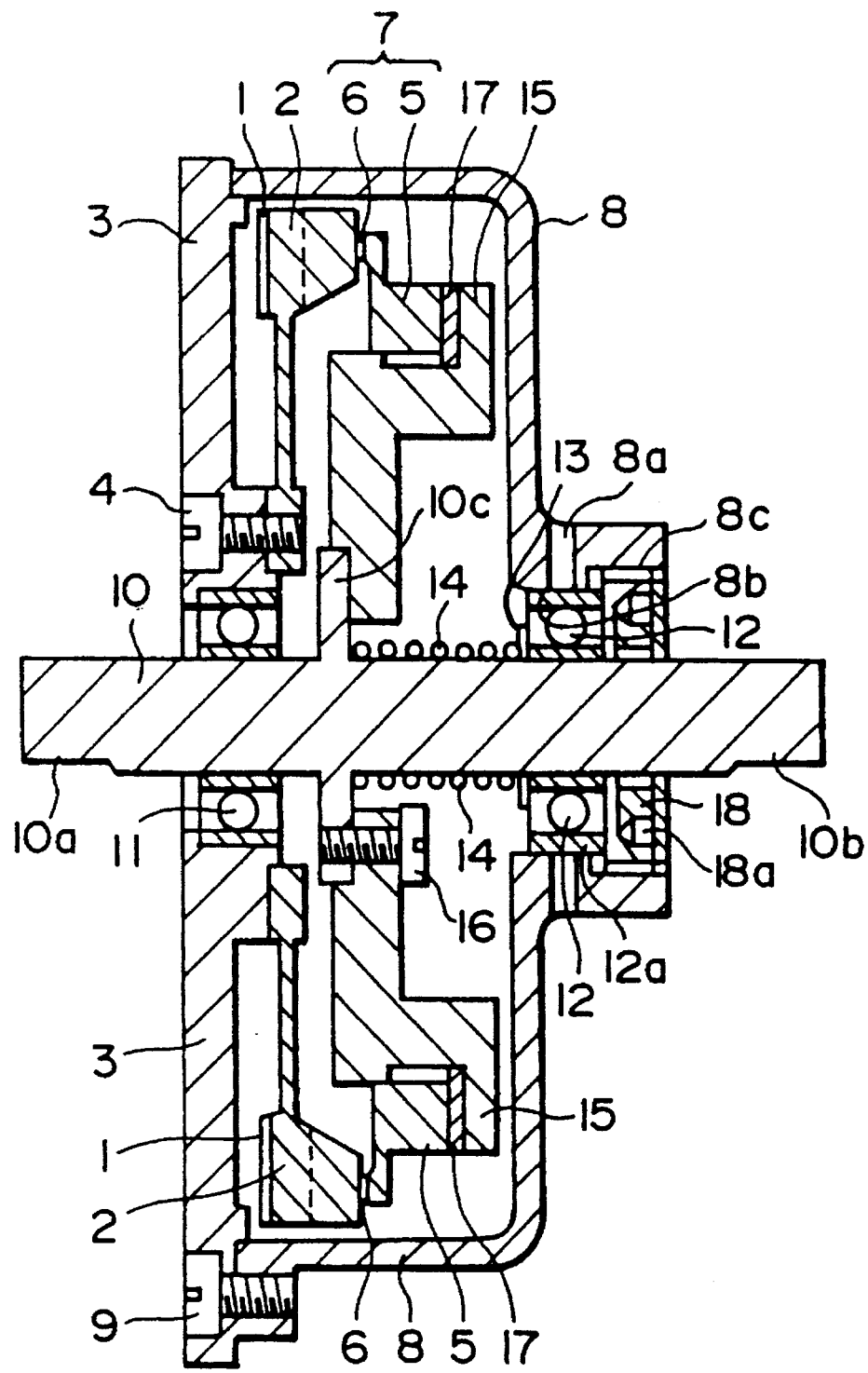
FIG. 1 is a longitudinal cross-sectional view schematically showing the construction of a vibration wave motor constructed with the present invention applied thereto.
Figure 2:
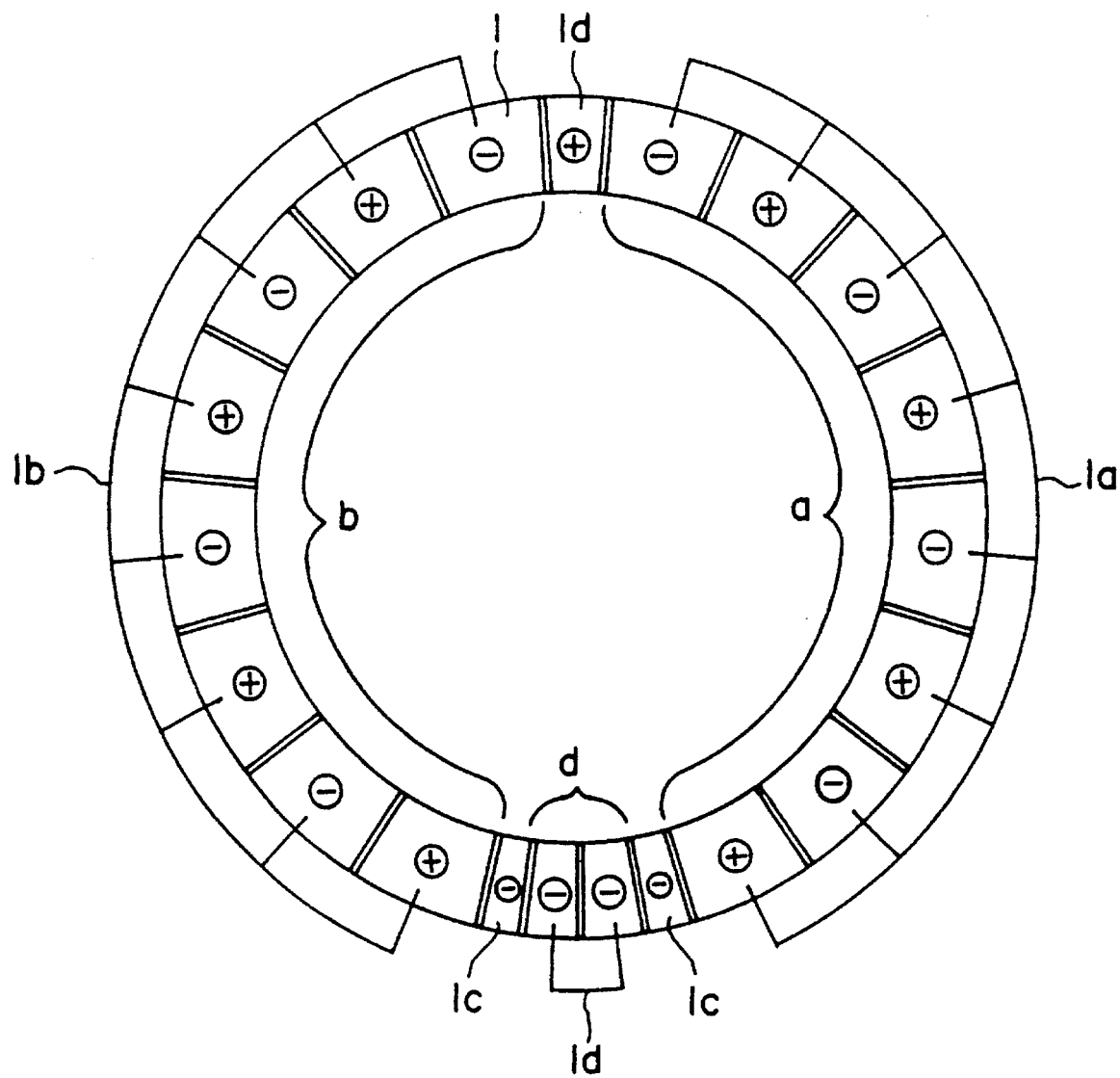
FIG. 2 is a plan view illustrating the arrangement of a group of piezo-electric elements constituting a vibration member.

FIG. 1 is a longitudinal cross-sectional view showing an embodiment of a vibration wave motor according to the present invention.

In this figure, the reference numeral 2 designates an annular vibration member substrate formed of a metallic material such as stainless steel. A group of thin annular piezo-electric elements 1 are concentrically secured to the back of the vibration member substrate 2 by a heat-resisting epoxy resin adhesive agent, and the sliding surface of the front surface side of the vibration member substrate 2 is axially formed of a number of circumferential grooves to secure a large vibration amplitude of a travelling vibration wave, thereby forming a comb-tooth-like shape. The reference numeral 3 denotes a housing formed of a metallic material of high heat conductivity. A first ball bearing 11 is provided in the central portion of the housing 3, and the vibration member 2 is fixed by a screw 4 coaxially with the axis of the first ball bearing 11.

The reference numeral 10 designates an output shaft formed with a flange portion 10c. One end portion 10a of the output shaft 10 is extended through and supported for axial movement by the inner race of the first ball bearing 11, and the other end portion 10b of the output shaft 10 extends for axial sliding movement and rotation through the inner race of a second ball bearing 12 which will be described later and the axial force of a spring pressure adjusting nut member 18. The reference numeral 15 denotes a disk-like intermediate member fixed to the flange portion 10c of the output shaft 10 by a screw 16. A movable member 7 has an annular shape and is concentrically fitted and fixed to the outer peripheral end portion of the intermediate member 15.

The movable member 7 is comprised of an annular back-up member 5 formed of a metal having a high heat conductivity such as an aluminum alloy, and a sliding member 6 concentrically secured to the surface of the back-up member 5 by a heat-resisting epoxy adhesive agent. In the present embodiment, the sliding member 6 is a composite resin layer having a blending and structure which will be described below, for example, as an annular member having a thickness of 1 mm. Sliding member 6 contacts the sliding surface of the vibration member 2.

The movable member 7 is a structure that it is supported by the intermediate member 15 through an elastic sheet member 17 made of rubber and provided on the bottom of the movable member. An axial load produced by a coil-like compression spring member 14 resiliently mounted between the flange portion 10c of the output shaft 10 and the second ball bearing 12 is imparted axially of the back-up member 5 through the elastic sheet member 17, whereby the sliding surface of the vibration member 2 and the sliding member of the movable member 7 are brought into pressure contact with each other.

The reference numeral 8 designates the housing cover of the vibration wave motor which is fixed to the housing 3 by a screw 9. A second ball bearing 12 is axially slidably fitted in a bearing fitting hole 8b formed in the central portion of the housing cover 8 and further, the inner peripheral surface of this bearing fitting hole 8b is formed with a threaded portion 8c with which a spring pressure adjusting nut member 18 is threadably engaged. The spring pressure adjusting nut member 18 is in contact with only the outer race 12a of the second ball bearing 12, and the inner race 12b of the second ball bearing 12 is axially slidable and rotatable relative to the output shaft 10, and design is made such that for example, a jig (not shown) formed with two plug bars on the fore end portion thereof is inserted into two small holes 18a formed in the spring pressure adjusting nut member 18 and is rotated clockwise, whereby the spring pressure adjusting nut member 18 pushes the second ball bearing 12 leftwardly as viewed in the figure while threadably advancing leftwardly as viewed in the figure, thereby compressing the compression spring member 14 to increase its spring force. If the jig is rotated in the opposite direction, the compression spring member 14 can be expanded to weaken its spring force. Thus, the shaft load adjustment of the output shaft 10 by the flexure of the spring 14 is made possible. It is the ordinary assembling procedure to pour an adhesive agent through a small hole 8a in the housing cover 8 after the shaft load adjustment of the output shaft 10, and then secure the outer race 12a of the second ball bearing 12 to the housing cover 8.

A spacer 13 bearing against only the inner race 12b of the second ball bearing 12 is disposed between one end of the compression spring member 14 and the second ball bearing 12, and one end of the compresion spring member 14 bears against the spacer 13 so that the output shaft can rotate smoothly without hindrance. The compression spring member 14 should preferably be as small as possible in its spring constant in order to make the fluctuation of the shaft load for the flexure of the spring small.

The piezo-electric element group 1 of the above-described vibration member 2 is comprised of an A piezo-electric element group 1a and a B piezo-electric element group 1b for driving (polarization-treated as shown), two vibration detecting piezo-electric elements 1c for detecting the vibrating state, and a common electrode 1d for grounding, the B piezo-electric element group 1b being arranged relative to the A piezo-electric element group 1a at a pitch shifted by ¼ of the wavelength ($\lambda$) of the vibration frequency to be excited.

By frequency voltages differing by 90° in phase from each other being applied to the A piezo-electric element group 1a and the B piezo-electric element group 1b, a travelling vibration wave is generated on the surface of the vibration member 2, and the movable member 7 brought into pressure contact with the vibration member 2 as described above is frictionally driven to rotate the output shaft 10 through the intermediate member 15.

With regard to the vibration wave motor of the above-described construction, in order to study the material of the sliding member 6 which is the composite resin layer of the movable member 7, a plate-like member as a sliding member comprising the blending shown in Table 1 below was formed (Examples 1 and 2 and Reference Examples 1–6) and the flexural elastic modulus thereof was measured in accordance with the following.

The sliding members of the Examples are as per the following in which the non-fiber type fillers given in the table below were blended with aromatic polyimide resin as thermosetting resin which is the base material.

EXAMPLE 1

8.5% by weight of tetrafluoroethylene resin powder (average particle diameter 9 μm) and 6.0% by weight of lead monoxide powder (average particle diameter 10 μm) were blended as non-fiber type fillers (main toughening agents, i.e., friction regulating agents) with aromatic polyimide resin (PI) which is a condensate of biphenyl tetracarboxylic acid 2-anhydride and aromatic diamine, and the mixture was compression-molded and cutting-worked to thereby provide a plate-like member (a sliding member).

EXAMPLE 2

A plate-like member was molded in the same manner as Example 1 with the exception that the amount of the aforementioned tetrafluoroethylene resin powder blended was 9.4% and further, 6.5% by weight of molybdenum powder was blended.

As Reference Examples, a heat-resisting thermoplastic resin having a glass transition point of 100° C. or higher was dispersively filled up with carbon fiber in the amounts given in Table 1 to improve wear resistance to thereby mold plate-like members similar to the Examples, and the flexural elastic moduli thereof were measured, and the result is shown in Table 1. The addition of carbon fiber is chiefly for the purpose of improving wear resistance, and from this purpose, the amount added should desirably be great, but if the amount added exceeds 30%, injection molding will become difficult. It is known that the addition of carbon fiber makes the elastic modulus and hardness of the material greater with a result that the performance of the motor is improved.

Measurement of Flexural Elastic Modulus

Measurement was carried out on the basis of D792 in American Society for Testing and Material (hereinafter referred to as ASTM) by the use of a plate having a thickness of 3.2 mm.

stainless steel whose coefficient of thermal expansion is approximate to the coefficient of thermal expansion in the surface direction of the piezo-electric element group 1 secured thereto and whose coefficient of thermal expansion as a metal is relatively small and which is a resilient material small in internal loss. As the sliding surface with which the movable member is brought into pressure contact, use was made of the hard surface (Hv=600) of a nickel-phosphor alloy obtained by silicon carbide being subjected to entectoid (of the order of 10%), the hard surface being annealed to increase its hardness (Hv=1100).

As regards the making of the movable member 7, an annular back-up member generally having the same dimensions as the vibration member 2 was formed by the use of an aluminum alloy, and was adhesively fixed by the use of an epoxy adhesive agent with the plate-like member (the sliding member) shown in Table 1 above as the composite resin layer. Each of the sliding members 6 shown in Reference Examples 1–5 was shaved out at a thickness of about 1 mm so that one surface of a plate member having a thickness of 10 mm which was an extrusion-molded article might be a sliding surface, and was secured to the back-up member 5, whereafter the sliding surface was cut (or polished) by a minute amount and was finally made into a thickness of 1 mm and carbon fiber was exposed on the sliding surface. This is for the purpose of preventing any difference from appearing between the initial performance and the performance with time of the motor.

PTFE of 5% by weight was added to the composite resin layers of Reference Examples 2, 4 and 5 to improve the

TABLE 1

| | Base material resin | Main toughening agent (wt %) | Heat deformation temperature at great load (°C.) | Flexural elastic modulus (kgf/cm$^2$) |
|---|---|---|---|---|
| Reference Example 1 | PEI | Carbon fiber (20) | 204 | 122500 |
| Reference Example 2 | PAI | Carbon fiber (30) | 282 | 202000 |
| Reference Example 3 | PI | Carbon fiber (30) | 204 | |
| Reference Example 4 | PEEK | Carbon fiber (30) | 280 | 137000 |
| Reference Example 5 | PES | Carbon fiber (30) | 215 | 95000 |
| Reference Example 6 | Aromatic PA | Carbon fiber (30) | — | 188000 |
| Example 1 | Aromatic PI | PTFE (8.5) + lead oxide (6) | 350 | 22700 |
| Example 2 | Aromatic PI | PTFE (9.4) + molybdenum (6.5) | 350 | 37900 |

It will be understood that as is apparent from the table above, the composite resin layer of the present embodiment, for example, Examples 1 and 2 exhibit much higher heat deformation temperatures than the plate-like members of the Reference Examples using thermoplastic resin as the base material.

Example

The plate-like member (the sliding member) shown in Table 1 above was secured to the back-up member to make a movable member, and this was used to make the vibration wave motor of FIG. 1.

The vibration member substrate of the vibration member 2 was formed as an annular one having a diameter of 73 mm and an axial dimension of 7 mm by the use of martensite lubricating property during sliding movement. Also, in the vibration wave motors of the Reference Examples, carbon fiber was blended with the composite resin layer providing the sliding surface of the movable member and therefore, the aforementioned super-hard material composed of tungsten carbide and cobalt was thermally sprayed onto the sliding surface of the vibration member, which was thus made into a hard surface (Hv≃1200).

The movable member having secured thereto the composite resin layer (Reference Examples 1–6 and Examples 1–2) comprising the above-described sliding member was incorporated into the vibration wave motor of the high output type described with reference to FIG. 1, and "echo", "output" and "torque irregularity" were measured in accordance with the following. The results are shown in Table 2 below.

Measurement of Echo

The pressure force produced by the compression spring member 14 in the vibration wave motor of FIG. 1 was set to 9 kgf, and the echo during no-load rotation was measured by the use of FFT. The result of the measurement is roughly shown as the presence of echo and the absence of echo in Table 2.

Measurement of Output

The magnitude of the output at the rated torque (4 kgcm) was measured by the use of a low speed type torque detector. The result of the measurement was characterized as great, medium or small depending on the magnitude of the output.

Measurement of Torque Irregularity

The torque irregularity when the motor was continuously driven at rated values (4 kgcm, 100 rpm) was measured by the use of a low speed type torque detector. The result of the measurement was characterized as great, medium or small depending on the amount of fluctuation of the torque.

In all examples, the measurements of echo and output were carried out with the amount of vibration amplitude of the vibration member 2 as a predetermined amount.

Also, in the measurement of the torque irregularity during rating, the amount of vibration amplitude of the vibration member 2 was set for each material of the sliding member so that rated values might be obtained.

TABLE 2

| | During 4 kgcm, 100 rpm | | During 4 kgcm | Echo during no- |
|---|---|---|---|---|
| | Torque waviness | Torque irregularity | output | load rotation |
| Reference Example 1 | Medium | Small | Medium | Present |
| Reference Example 2 | Medium | Medium | Medium | Present |
| Reference Example 3 | Medium | Medium | Medium | Present |
| Reference Example 4 | Medium | Medium | Medium | Present |
| Reference Example 5 | Medium | Small | Medium | Present |
| Reference Example 6 | Great | Medium | Small | Present |
| Example 1 | Small | Small | Medium | Absent |
| Example 2 | Small | Small | Medium | Absent |

As is apparent from the result shown in the table above, when continuous operation was started at rated values (4 kgcm, 100 rpm), waviness of torque was seen in each movable member of Reference Examples 1 to 6, particularly in the several minutes immediately after driving, while the amount of waviness was small in Examples 1 and 2.

Also, the torque irregularity after two hours of continuous operation was of the order of 2% in the Examples 1 and 2, that is, smaller than the 5% in Reference Examples 1 to 6.

The output during rating (4 kgcm) was in the range of 4.8–5.4 W in the Reference Examples 1 to 6, whereas in Examples 1 and 2, the output was 5.0–5.2 W, that is, in a practical, sufficiently usable range without any reduction as compared with the Reference Examples.

Further, as regards echo during no-load, the phenomenon of echo was seen in all of the sliding members of Reference Examples 1–6, while the phenomenon of echo did not occur at all in Examples 1 and 2.

Other Examples

In the following examples, in order to study the material of the sliding member 6, which is the composite resin layer of the movable member 7, plate-like members as the sliding member 6 consisting of the blending of Table 3 below were formed (Examples 3–6 and Reference Examples 1–6) and the flexural elastic moduli thereof were measured in accordance with the following.

The sliding members of Examples 3–6 are as per the following in which the non-fiber type filler (the main toughening agent, i.e., a friction regulating agent) given in Table 3 was blended with thermoplastic resin having a glass transition point of 140° C. or higher as a base material.

EXAMPLE 3

30% by weight of graphite powder as a non-fiber type toughening filler (the main toughening agent) was blended with "LLTEM" (tradename; produced by G.E., Inc.) (the glass transition point 215° C.) which is polyether imide (PEI), and the blend was made into a plate-like member (a sliding member) having a thickness of 1 mm by the injection molding method.

EXAMPLE 4

30% by weight of graphite powder was blended with "TORLON" (tradename; produced by Amoco Performance Products, Inc.) which is polyamideimide (PAI) (the glass transition point 275° C.), and the blend was made into a plate-like member similar to Example 3.

EXAMPLE 5

5–40%, desirably 30%, by weight of carbon beads (the average particle diameter 10 μm) as a non-fiber type toughening filler were blended with "New-TPI" (Tradename; produced by Mitsui Toatsu Kagaku Co., Ltd.) (the glass transition point 260° C.) which is polyimide (PI), and the blend was made into a plate-like member similar to Example 3.

EXAMPLE 6

5–40%, desirably 8.5%, by weight of tetrafluoroethylene (PTFE) powder (the average particle diameter 9 μm) as a solid lubricant (a friction regulating agent) and 6.0% by weight of lead oxide powder (the average particle diameter 10 μm) were further blended with the blend of Example 5, and the blend was likewise made into a plate-like member.

As reference examples, the amounts of carbon fiber given in Table 3 were dispersively added to heat-resisting thermoplastic resin having a glass transition point of 100° C. or higher to improve wear resistance, and the mixtures were molded into plate-like members similar to Examples 3–6, and the flexural elastic moduli thereof were measured. The result is shown in Table 3. The addition of carbon fiber is chiefly for the purpose of improving wear resistance, and from this purpose, a greater amount of addition is desirable, but if the amount of addition exceeds 30%, injection molding will become difficult. It is known that the addition of carbon fiber increases the elastic modulus and hardness of the material with a result that the performance of the motor is improved.

Measurement of Flexural Elastic Modulus

Measurement was carried out on the basis of ASTM D792 by the use of a plate having a thickness of 3.2 mm.

TABLE 3

|  | Thermoplastic resin | Main toughening agent (wt %) | Glass transition point (°C.) | Flexural elastic modulus (kgf/cm$^2$) |
| --- | --- | --- | --- | --- |
| Reference Example 1 | PEI | Carbon fiber (20) | 215 | 122500 |
| Reference Example 2 | PAI | Carbon fiber (30) | 275 | 202000 |
| Reference Example 3 | PI | Carbon fiber (30) | 250 | 180000 |
| Reference Example 4 | PEEK | Carbon fiber (30) | 144 | 137000 |
| Reference Example 5 | PES | Carbon fiber (30) | 230 | 95000 |
| Reference Example 6 | Aromatic PA | Carbon fiber (30) | 125 | 188000 |
| Example 3 | PEI | Graphite (30) | 215 | 109000 |
| Example 4 | PAI | Graphite (30) | 275 | 75000 |
| Example 5 | PI | Carbon beads (30) | 250 | 51000 |
| Example 6 | PI | Carbon beads (12) | 250 | 40000 |

It will be understood that as is apparent from Table 3, the composite resin layers of Examples 3–6, particularly Examples 3 and 4, are small in flexural elastic modulus as compared with the plate-like members of Reference Examples 1 and 2 in which the same thermoplastic resin was used as the base material.

Also, it will be understood that Examples 5 and 6 are small in flexural elastic modulus as compared with Reference Example 3 in which the same thermoplastic resin was used as the base material.

The plate-like member (the sliding member) shown in Table 3 was secured to a back-up member to make a movable member, which was used to make the vibration wave motor of FIG. 1.

The vibration member substrate of the vibration member 2 was formed as an annular one having a diameter of 73 mm and axial dimension of 7 mm by the use of martensite stainless steel which is a resilient material whose coefficient of thermal expansion is approximate to the coefficient of thermal expansion in the surface direction of the piezoelectric element group 1 secured thereto and whose coefficient of thermal expansion is relatively small as a metal and whose internal loss is also small. As the sliding surface with which the movable member was brought into pressure contact, use was made of the hard surface (Hv=600) of a nickel-phosphor group alloy obtained by subjecting silicon carbide (SIC) to entectoid (of the order of 10%), and the hard surface was annealed to increase its hardness (Hv=1100).

To make the movable member, an annular back-up member generally of the same dimensions as the vibration member was formed of a popular aluminum alloy, and the plate-like member (the sliding member) shown in Table 3 above was fixed thereto as a composite resin layer by the use of an epoxy adhesive agent. This sliding member 6 was shaved out at a thickness of about 1 mm so that one surface of a plate member having a thickness of 10 mm which is an injection-molded article might be a sliding surface, and was secured to the back-up member 5, whereafter the sliding surface was cut (or polished) by a minute amount to thereby provide a final thickness of 1 mm. Carbon fiber was exposed on the sliding surface. for preventing any difference from appearing between the initial performance and the performance with time of the motor.

Each of the composite resin layers of Reference Examples 2, 4 and 5 was filled up with 5% by weight of PTFE to improve the lubricating property during sliding movement. Also, in the vibration wave motors of the Reference Examples, carbon fiber was blended with the composite resin layer providing the sliding surface of the movable member. The aforedescribed super-hard material composed of tungsten carbide and cobalt was thermally sprayed onto the sliding surface of the vibration member to thereby provide a hard surface (Hv≃1200).

The movable member having secured thereto the above-described resin layer comprising the sliding member (Reference Examples 1–6 and Examples 3–6 shown in Table 3 above) was incorporated into the vibration wave motor of the high output type described with reference to FIG. 1, and "echo", "output" and "torque irregularity" were measured in accordance with the following. The results are shown in Table 4 below.

Measurement of Echo

The pressure force produced by the compression spring member 14 in the vibration wave motor of FIG. 1 was set to 9 kgf, and the echo during no-load rotation was measured by the use of FFT. The result of the measurement is roughly shown as the presence of echo and the absence of echo.

Measurement of Output

The magnitude of the output at the rated torque (4 kgcm) was measured by the use of a low speed type torque detector.

The result of the measurement was categorized great, medium or small depending on the magnitude of the output.

Measurement of Torque Irregularity

The torque irregularity when the motor was continuously driven at rated values (4 kgcm, 100 rpm) was measured by the use of a low speed type torque detector. The result of the measurement was categorized as medium or small depending of the amount of fluctuation of the torque.

In the measurements of echo and output, in all examples, the amount of vibration amplitude of the vibration member 2 was a preset constant amount.

Also, in the measurement of the torque irregularity during rating, the amount of vibration amplitude of the vibration member 2 was set for each material of the sliding member so that rated values might be obtained.

Further, as regards echo during no-load, the phenomenon of echo was seen in all of the sliding members of Reference Examples 1–6, while the phenomenon of echo did not occur at all in Examples 1 to 4.

Further Examples

In the following examples, the sliding member 6 forming the composite resin layer was provided dispersively by blending carbon graphite as a non-fiber type toughening filler (the main toughening agent, i.e., a friction regulating agent) (Example 7), PAN carbon fiber having an average length of 0.3 mm and an average diameter of 7 μm as a fiber type toughening filler (the main toughening agent) (Examples 8 and 9), and fluorine resin as a lubricant (Example 10), with aromatic polyester resin at respective rates shown in Table 5 below, and the blend was made into

TABLE 4

|  | During 4 kgcm, 100 rpm | | During 4 kgcm | Echo during no- |
|---|---|---|---|---|
|  | Torque waviness | Torque irregularity | output | load rotation |
| Reference Example 1 | Medium | Small | Medium | Present |
| Reference Example 2 | Medium | Medium | Medium | Present |
| Reference Example 3 | Medium | Medium | Medium | Present |
| Reference Example 4 | Medium | Medium | Medium | Present |
| Reference Example 5 | Medium | Small | Medium | Present |
| Reference Example 6 | Great | Medium | Small | Present |
| Example 1 | Medium | Small | Small | Absent |
| Example 2 | Medium | Small | Small | Absent |
| Example 3 | Medium | Small | Small | Absent |
| Example 4 | Small | Small | Small | Absent |

As is apparent from the results shown in the table above, when continuous operation was first started at rated values (4 kgcm, 100 rpm), waviness of torque was observed in each movable member, particularly in the several minutes immediately after driving, while the amount of waviness was small in Example 4.

As regards the torque irregularity after two hours of continuous operation, the torque irregularity was of the order of 3% in Examples 1 to 4, wherein a non-fiber type toughening filler was blended, this being smaller than the 5% in Reference Examples 1 to 6.

Also, the output during rating (4 kgcm) was in the range of 4.8–5.4 W in the Reference Examples, whereas it was 4.7–5.1 W in Examples 1 to 4, and this was a practical, usable range without any great reduction.

a plate-like member having a thickness of 1 mm by the injection molding method.

As Reference Examples 1–6, a composite resin layer in which carbon fiber was dispersively added to the heat-resisting thermoplastic resin shown in Table 5 below was constructed as shown in Table 5, and was molded in the same manner as the Examples, and the flexural elastic modulus thereof was measured. The result of the measurement is shown in Table 5. Reference Example 7 is an example in which aromatic polyester resin alone was used.

Measurement of Flexural Elastic Modulus

Measurement was carried out on the basis of ASTM D792 by the use of a plate having a thickness of 3.2 mm.

TABLE 5

|  | Thermoplastic resin | Main toughening agent (wt %) | Glass transition point (°C.) | Flexural elastic modulus (kgf/cm$^2$) |
|---|---|---|---|---|
| Reference Example 1 | PI | Carbon fiber (30) | 250 | 180000 |
| Reference Example 2 | PAI | Carbon fiber (30) | 275 | 202000 |
| Reference Example 3 | PEI | Carbon fiber (20) | 215 | 122500 |
| Reference | PEEK | Carbon fiber | 144 | 137000 |

TABLE 5-continued

| | Thermoplastic resin | Main toughening agent (wt %) | Glass transition point (°C.) | Flexural elastic modulus (kgf/cm²) |
|---|---|---|---|---|
| Example 4 | | (30) | | |
| Reference Example 5 | PES | Carbon fiber (30) | 230 | 95000 |
| Reference Example 6 | Aromatic PA | Carbon fiber (30) | 125 | 188000 |
| Reference Example 7 | LCP (1) | — | 120 | 90000 |
| Example 7 | LCP (1) | Graphite (25) | 120 | 110000 |
| Example 8 | LCP (1) | Carbon fiber (30) | 120 | 290000 |
| Example 9 | LCP (2) | Carbon fiber (30) | 120 | 360000 |
| Example 10 | LCP (1) | PTFE (30) | 120 | 85000 |

In the table above,

LCP(1): aromatic polyester (VECTRA: tradename; produced by Celanese, Inc.)

LCP(2): aromatic polyester (VECTRA, but high strength type).

The carbon fiber toughening type of great flexural elastic modulus is great in output or efficiency but great in torque irregularity, while the non-fiber toughening type is relatively small in output or efficiency but small in torque irregularity.

Example

A sliding member of the blending shown in Table 5 above was secured to a back-up member to thereby make a movable member, which was used to make the vibration wave motor of FIG. 1. The vibration member substrate of the vibration member 2 was formed as an annular one having a diameter of 73 mm and axial dimension of 7 mm by the use of martensite stainless steel which is a resilient material whose coefficient of thermal expansion is approximate to the coefficient of thermal expansion in the surface direction of the piezo-electric element group 1 secured thereto and whose coefficient of thermal expansion is relatively small as a metal and whose internal loss is also small. The aforementioned super-hard material composed of tungsten carbide and cobalt was thermally sprayed onto the sliding surface with which the movable member was brought into pressure contact, whereby the sliding surface was made into a hard surface (Hv=1100). Use was also made of a hard surface (Hv=900) of electroless plating obtained by subjecting chemical nickel to entectoid of silicon carbide.

The movable member was formed by forming an annular back-up member generally of the same dimensions as the vibration member by the use of a popular aluminum alloy, and the sliding member was adhesively fixed as a composite resin layer by the use of an epoxy adhesive agent. This sliding member 6 was shaved out at a thickness of about 1 mm so that one surface of a plate member having a thickness of 10 mm which is an injection-molded article might be a sliding surface, and was secured to the back-up member 5, whereafter the sliding surface was cut (or polished) by a minute amount so as to provide a thickness final of 1 mm finally. The toughening filler was exposed on the sliding surface, for preventing any difference from appearing between the initial performance and the performance with time of the motor. The composite resin layers of Reference Examples 2, 4 and 5 shown in Table 5 were filled with 5% by weight of PTFE to improve the lubricating property during-sliding movement.

The movable member having secured thereto the composite resin layer comprising the above-described sliding member (Reference Examples 1–6 and Examples 7–10) was incorporated into the vibration wave motor of the high output type described with reference to FIG. 1, and "echo", "output" and "torque irregularity" were measured in accordance with the following. The results are shown in Table 6.

Measurement of Echo

The pressure force produced by the compression spring member 14 in the vibration wave motor of FIG. 1 was set to 9 kgf, and the echo during no-load rotation was measured by the use of FFT. The result of the measurement is roughly shown as the presence of echo and the absence of echo.

Measurement of Output

The magnitude of the output at the rated torque (4 kgcm) was measured by the use of a low speed type torque detector. The result of the measurement was categorized great, medium or small depending on the magnitude of the output.

Measurement of Torque Irregularity

The torque irregularity when the motor was continuously driven at rated values (4 kgcm, 100 rpm) was measured by the use of a low speed type torque detector. The result of the measurement was categorized as medium or small depending on the amount of fluctuation of the torque.

In the measurements of echo and output, in all examples, the amount of vibration amplitude of the vibration member 2 was a preset constant amount.

Also, in the measurement of the torque irregularity during rating, the amount of vibration amplitude of the vibration member 2 was set for each material of the sliding member so that rated values might be obtained.

TABLE 6

| | Echo during no-load rotation | Output during 4 kgcm | Torque irregularity during 4 kgcm, 100 rpm |
|---|---|---|---|
| Reference Example 1 | Present | Medium | Medium |
| Reference Example 2 | Present | Medium | Medium |
| Reference Example 3 | Present | Medium | Small |
| Reference Example 4 | Present | Medium | Medium |
| Reference Example 5 | Present | Medium | Small |
| Reference Example 6 | Present | Small | Medium |
| Example 7 | Absent | Medium | Small |

TABLE 6-continued

|  | Echo during no-load rotation | Output during 4 kgcm | Torque irregularity during 4 kgcm, 100 rpm |
|---|---|---|---|
| Example 8 | Absent | Great | Medium |
| Example 9 | Absent | Great | Medium |
| Example 10 | Absent | Medium | Small |

As is apparent from the result shown in the table above, with regard to the echo during no-load, the phenomenon of echo was observed in all of the sliding members of Reference Examples 1–6 in Tables 5 and 6, while in Examples 7–10, the phenomenon of echo did not occur at all and the vibration attenuating characteristic of aromatic polyester as thermoplastic resin and the elastic anisotropy and multilayer structure of the material were confirmed.

As regards the output during rating (4 kgcm), the Reference Examples were in the range of 4.8–5.4 W, whereas Example 8 exhibited an output as great as 8.4 W and Example 9 also exhibited a high value of 7.0 W. Example 7 exhibited 5.1 W and Example 10 exhibited 4.9. These values are somewhat low values as compared with the Reference Examples, but are practical, usable ranges and on the other hand, as described above, each was effective with respect to the prevention of echo, and particularly the following torque irregularity.

Further, as regards the torque irregularity during continuous driving at rated values, Examples 8–9 are substantially equal to Reference Examples 1, 2, 4 and 6, and in Examples 7–10, the torque irregularity was 3% or less for 4 kgcm.

As has been described above, in the high output type vibration wave motor of the present invention, thermosetting resin, for example, aromatic polyimide resin, or thermoplastic resin, for example, aromatic polyester, is used as the base material to form the sliding member of the movable member, and a friction regulating agent is blended therewith, whereby the waviness and irregularity of torque during a rated great output can be improved.

There is also the effect that "echo" can be avoided during no-load or low-load driving.

Further, as the sliding surface of the vibration member, use can be made of an inexpensive hard surface formed by the electroless plating of a nickel-phosphor group alloy obtained by subjecting silicon carbide (SIC) to entectoid and therefore, there can be constructed a high output type vibration wave motor of high accuracy equal to that when use is made of an expensive hard surface onto which was thermally sprayed a conventional super-hard material composed of tungsten carbide and cobalt, and this also leads to the effect that a vibration wave motor can be provided at low costs.

What is claimed is:

1. A vibration wave motor, comprising:
    a vibration member for generating a vibration wave therein in response to an applied electrical signal; and
    a contact member, having a sliding portion which contacts said vibration member, for receiving the vibration wave generated in said vibration member, said sliding portion being formed of a composite resin comprising a base material of thermoplastic resin and a non-fibrous carbon bead material blended therewith, said non-fibrous carbon bead material having an average particle diameter of 10 to 30 µm.

2. A vibration wave motor according to claim 1, wherein said thermoplastic resin is polyimide resin.

3. A vibration wave motor according to claim 1, wherein said carbon bead material has high hardness and high heat conductivity.

4. A vibration wave motor according to claim 1, wherein an average diameter of said carbon bead material is 10 µm.

5. A vibration wave motor according to claim 1, the carbon bead material is blended in an amount in the range of 5 to 40 wt. %.

6. A vibration wave motor according to claim 1, wherein said composite resin further comprises a friction regulating agent.

7. A vibration wave motor according to claim 6, wherein said friction regulating agent includes at least one of a tetrafluoroethylene powder and a lead oxide powder.

8. A vibration wave motor according to claim 7, wherein an average diameter of said tetrafluoroethylene powder is 9 µm.

9. A vibration wave motor according to claim 7, wherein an amount of said tetrafluoroethylene is 5–40 wt. % and an amount of said lead oxide powder is 6 wt. %.

10. A vibration wave motor according to claim 1, wherein at least a surface of said vibration member is made of martensite type stainless steel.

11. A vibration wave actuator, comprising:
    a vibration member for generating a vibration wave therein in response to an applied electrical signal, and having a first contact portion; and
    a contact member having a second contact portion frictionally contacting the first contact portion of said vibration member, for receiving the vibration wave;
    wherein one of said first contact portion and said second contact portion is formed of a composite resin comprising a base material of thermoplastic resin and a non-fibrous carbon bead material blended therewith, said non-fibrous carbon bead material having an average particle diameter of 10 to 30 µm.

12. A vibration wave motor according to claim 11, wherein an average diameter of said carbon bead material is 10 µm.

13. A vibration wave motor according to claim 11, wherein the other one of said first and second contact portions is comprised of a martensite type stainless steel.

14. A vibration wave motor, comprising:
    a vibration member for generating a vibration wave therein in response to an applied electrical signal; and
    a contact member, having a sliding portion which contacts said vibration member, for receiving the vibration wave generated in said vibration member, said sliding portion being formed of a composite resin comprising a base material of thermoplastic resin and a carbon bead material blended therewith, said carbon bead material including non-fibrous spherical carbon having an average particle diameter of 10 to 30 µm.

15. A vibration wave motor, comprising:
    a vibration member for generating a vibration wave therein in response to an applied electrical signal; and
    a contact member, having a sliding portion which contacts said vibration member, for receiving the vibration wave generated in said vibration member, said sliding portion being formed of a composite resin comprising a base material of thermoplastic resin and a non-fibrous carbon material blended therewith, said carbon material including spherical carbon having a particle diameter of 10 to 30 µm.

16. A vibration wave motor according to claim 15, wherein said thermoplastic resin is polyimide resin.

17. A vibration wave motor according to claim 15, wherein an average diameter of said spherical carbon is 10 μm.

18. A vibration wave motor according to claim 15, wherein said carbon material is blended in an amount in the range of 5 to 40 wt. %.

19. A vibration wave motor according to claim 15, wherein said composite resin further comprises a friction regulating agent.

20. A vibration wave motor according to claim 15, wherein said friction regulating agent includes at least one of a tetrafluoroethylene powder and a lead oxide powder.

21. A vibration wave motor according to claim 20, wherein an average diameter of said tetrafluoroethylene powder is 9 μm.

22. A vibration wave motor according to claim 20, wherein an amount of said tetrafluoroethylene is 5–40 wt. % and an amount of said lead oxide powder is 6 wt. %.

23. A vibration wave motor according to claim 15, wherein at least a surface of said vibration member is made of martensite type stainless steel.

24. A vibration wave actuator, comprising:

a vibration member for generating a vibration wave therein in response to an applied electrical signal, and having a first contact surface; and a contact member having a second contact portion frictionally contacting the first contact portion of said vibration member, for receiving the vibration wave;

wherein one of said first contact portion and said second contact portion is formed of a composite resin comprising a base material of thermoplastic resin and a non-fibrous carbon material blended therewith, said carbon material including spherical carbon having a particle diameter of 10 to 30 μm.

25. A vibration wave motor according to claim 24, wherein an average diameter of said spherical carbon is 10 μm.

26. A vibration wave motor according to claim 24, wherein the other one of said first and second contact portions is comprised of a martensite type stainless steel.

* * * * *

UNITED STATES PATENT AND TRADEMARK OFFICE
CERTIFICATE OF CORRECTION

PATENT NO. : 5,557,157    Page 1 of 2
DATED : September 17, 1996
INVENTOR(S) : TAKAYUKI SHIRASAKI It is certified that error appears in the above-indentified patent and that said Letters Patent is hereby corrected as shown below:

Column 3

Line 25, "Alternatively" should read --Alternatively,--.

Column 4

Line 43, "transition a" should read --a transition--.

Column 7

Line 27, "Material" should read --Materials--.

Column 12

Line 14, "surface." should read --surface,--.

UNITED STATES PATENT AND TRADEMARK OFFICE
CERTIFICATE OF CORRECTION

PATENT NO. : 5,557,157
DATED : September 17, 1996
INVENTOR(S) : TAKAYUKI SHIRASAKI It is certified that error appears in the above-indentified patent and that said Letters Patent is hereby corrected as shown below:

<u>Column 15</u>

Line 37, "thickness final" should read --final thickness--.

<u>Column 17</u>

Line 22, "4.9." should read --4.9W.--.

Signed and Sealed this

Eleventh Day of February, 1997

BRUCE LEHMAN

*Attest:*

*Attesting Officer*     *Commissioner of Patents and Trademarks*